(12) United States Patent
Burka et al.

(10) Patent No.: US 12,203,177 B2
(45) Date of Patent: Jan. 21, 2025

(54) METHOD FOR APPLYING A CORROSION PROTECTION LAYER TO A SURFACE TO BE PROTECTED OF A COMPONENT

(71) Applicant: Airbus Operations GmbH, Hamburg (DE)

(72) Inventors: Patryk Burka, Hamburg (DE); Eugen Gorr, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 351 days.

(21) Appl. No.: 17/536,629

(22) Filed: Nov. 29, 2021

(65) Prior Publication Data
US 2022/0170165 A1 Jun. 2, 2022

(30) Foreign Application Priority Data

Dec. 1, 2020 (DE) ...................... 10 2020 131 895.2

(51) Int. Cl.
*C23F 15/00* (2006.01)
(52) U.S. Cl.
CPC .................................... *C23F 15/00* (2013.01)
(58) Field of Classification Search
None
See application file for complete search history.

(56) References Cited

U.S. PATENT DOCUMENTS

| | | | | |
|---|---|---|---|---|
| 4,099,280 A | * | 7/1978 | Hoppe | ..................... A47K 3/40 |
| | | | | 264/DIG. 83 |
| 5,433,165 A | * | 7/1995 | McGuiness | ........ B29D 99/0014 |
| | | | | 264/225 |
| 6,508,974 B1 | * | 1/2003 | Loving | ................. B29C 70/547 |
| | | | | 112/440 |
| 10,350,857 B2 | | 7/2019 | Naritomi et al. | |
| 2005/0156095 A1 | | 7/2005 | Vichniakov et al. | |
| 2016/0325510 A1 | * | 11/2016 | Evans | ................ B29D 99/0014 |

FOREIGN PATENT DOCUMENTS

| | | |
|---|---|---|
| DE | 21 04 585 A1 | 8/1972 |
| EP | 3 090 866 A1 | 11/2016 |
| WO | WO 2005/110736 A2 | 11/2005 |

OTHER PUBLICATIONS

European Search Report for Application No. 21211130 dated Apr. 29, 2022.
German Search Report for Application No. 102020131895 dated May 25, 2021.

* cited by examiner

*Primary Examiner* — Michael N Orlando
*Assistant Examiner* — Abhishek A Patwardhan
(74) *Attorney, Agent, or Firm* — KDW Firm PLLC

(57) ABSTRACT

A method for applying a corrosion protection layer to a surface to be protected of a component including providing the corrosion protection layer having a first surface and a second surface arranged opposite this, laying the first surface of the corrosion protection layer on a bottom face of a mold, laying the surface to be protected of the component on the second surface of the corrosion protection layer so as to enclose a layer of hardenable sealing compound, closing the mold by applying a bend-flexible cover so as to enclose the corrosion protection layer and the component, evacuating the mold so that the cover presses the component in the direction of the corrosion protection layer, and removing the vacuum and the cover after hardening of the sealing compound.

6 Claims, 1 Drawing Sheet

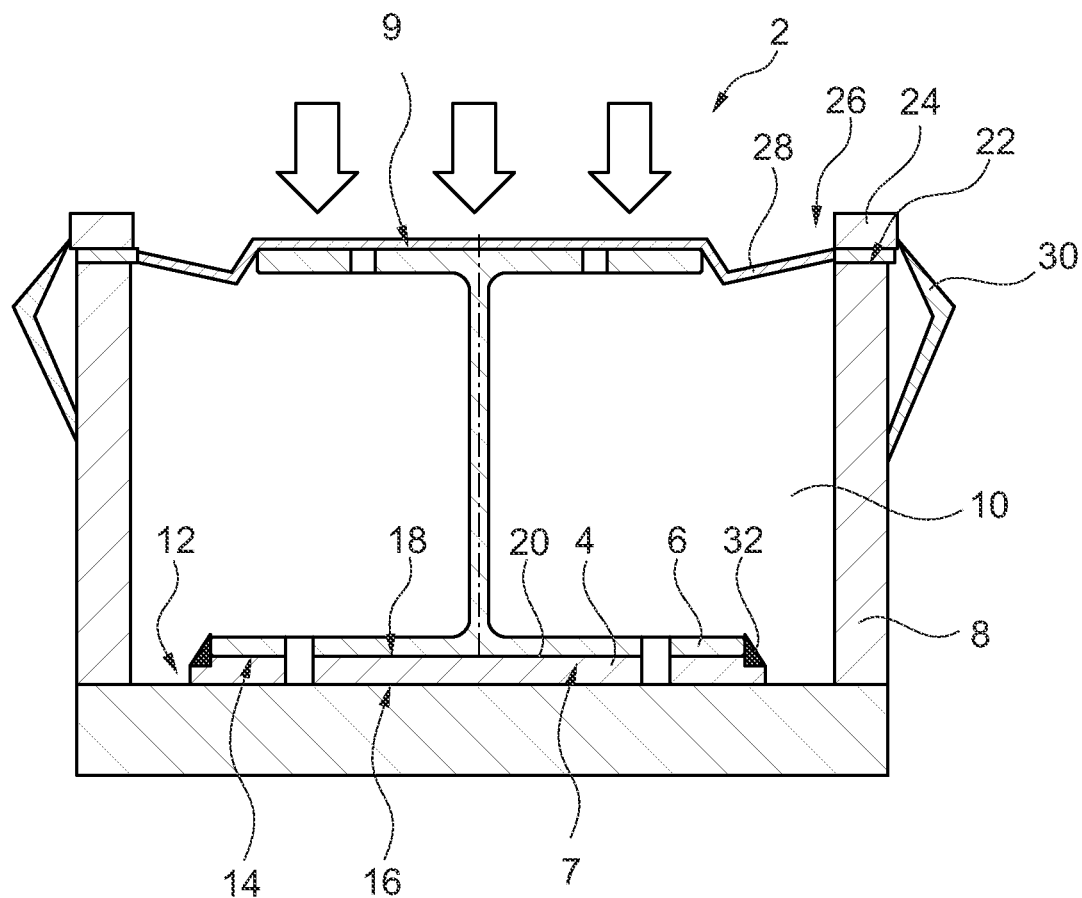
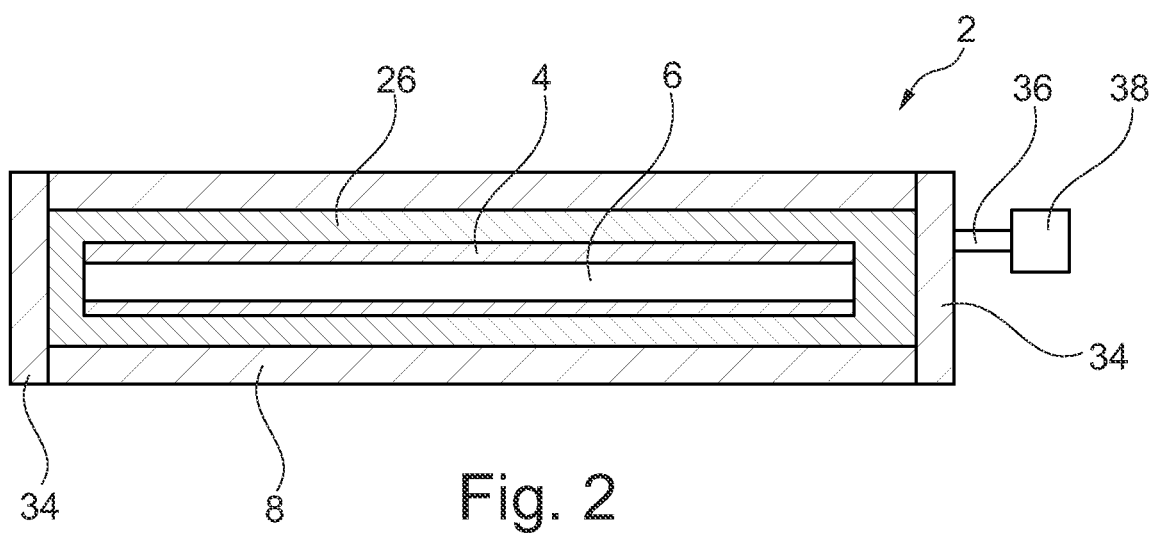

METHOD FOR APPLYING A CORROSION PROTECTION LAYER TO A SURFACE TO BE PROTECTED OF A COMPONENT

CROSS-REFERENCE TO RELATED APPLICATION

This application claims priority to German Patent Application No. 10 2020 131 895.2 filed Dec. 1, 2020, the entire disclosure of which is incorporated by reference herein.

TECHNICAL FIELD

The invention concerns a method for applying a corrosion protection layer to a surface to be protected of a component. The invention furthermore concerns a system for applying a corrosion protection layer to a surface to be protected of a component.

BACKGROUND

In the prior art, there are many methods and processes for achieving corrosion protection of components at risk of corrosion. Such components usually have installation situations which entail frequent contact with a corrosion-promoting environment. As well as motor vehicles, ships, general metallic constructions in the open air or damp environments, components on and in aircraft are also susceptible to corrosion. As well as many other examples, for example floor carriers below or floor rails in cabin floors of aircraft cabins are susceptible to corrosion. There, as well as condensation due to varying temperatures and pressure conditions, frequent soiling can be expected, for example from liquids escaping or dripping from the cabin. It is known to equip such components with a corrosion protection layer, which comprises for example the application of a thin titanium sheet or titanium coating. The application of such a corrosion protection layer may be difficult since complex alignment, temporary fixing and bonding are necessary. This can be very difficult in particular when lengthy rail-like components with a narrow surface to be protected must be thus equipped.

SUMMARY

It is an object of the invention to propose a method for applying a corrosion protection layer to a component susceptible to corrosion, which is particularly simple but nonetheless, in particular with rail-like components, leads to a precise and durable connection.

This object is achieved by a method with the features disclosed herein. Advantageous embodiments and refinements are given in the description which follows.

A method is proposed for applying a corrosion protection layer to a surface to be protected of a component, having the steps: providing the corrosion protection layer having a first surface and a second surface arranged opposite this, laying the first surface of the corrosion protection layer on a bottom face of a mold, laying the surface to be protected of the component on the second surface of the corrosion protection layer so as to enclose a layer of hardenable sealing compound, closing the mold by applying a bend-flexible cover so as to enclose the corrosion protection layer and the component, evacuating the mold so that the cover presses the component in the direction of the corrosion protection layer, and removing the vacuum and the cover after hardening of the sealing compound.

Firstly, the corrosion protection layer is provided. This is an element separate from the component and is preferably configured so as to be planar. This means that the corrosion protection layer is a component with two surfaces which are spaced apart from one another in the thickness direction and preferably parallel to one another. Here for example, the first surface is selected as the outer surface, the second surface is a surface facing the component and is to be connected to the component. Since the corrosion protection layer serves purely for protection from external influences, it may be useful to configure this with a smaller material thickness. Depending on the material used, the thickness of the corrosion protection layer may be significantly less than one millimeter, for example 0.5 mm, 0.4 mm or less. This is evidently dependent on the application of the component to be protected, its installation situation and any requirements for as low a weight as possible.

Provision of the corrosion protection layer could in particular comprise cutting or producing the corrosion protection layer with a precise fit, so that its peripheral contour corresponds to a predefined contour which in particular corresponds to the contour of the surface to be protected of the respective component.

The first surface is laid on a bottom face of a mold. The mold serves to receive both the corrosion protection layer and the respective component which is connected to the corrosion protection layer. For this, the mold has a cavity. The cavity is delimited on one side by the bottom face. Casing faces may adjoin the bottom face at the side, run completely around the bottom face and extend above the component in the height direction. The mold is configured such that the cover lies on an edge facing away from the bottom face, so the corrosion protection layer and respective component may be completely enclosed in the mold.

The bottom face and/or the cavity of the mold may be configured such that the corrosion protection layer assumes a precisely predefined position when introduced separately. For this for example, the bottom face may have a depression which comes into contact with the contour of the corrosion protection layer. This is however merely an optional feature. Depending on the sealing compound used, the corrosion protection layer and the respective component may be fixed to one another with adequate cohesion before insertion in the mold, and need not be fixed to one another in the mold. This furthermore means that the two components are tacked to one another by the action of the sealing compound before insertion in the mold.

The particular advantage of the method according to the invention is that the corrosion protection layer and the surface to be protected may be continually loaded with a pressing force, in order to achieve a hardening of the sealing compound with predefined positioning. By exerting the pressing force on a side facing away from the corrosion protection layer, a force-induced slippage of the corrosion protection layer under the effect of the pressing force can be prevented. Furthermore, the contact of the cover with edges of the corrosion protection layer which tend to be sharp can be avoided. The bottom face, as a lower limit of the mold, may be designed sufficiently strong and form-stable that a very even and high force application can be achieved, in order to practically exclude local air inclusions between the corrosion protection layer and the component. This method is also suitable for longer, e.g. elongate or rail-like components, since only the length of the mold is decisive for receiving the component, and the local force effect depends purely on the vacuum in the mold. Several molds may be connected to one another in order to achieve longer component lengths. By using the bend-flexible cover, practically any components may be provided with the corrosion protection layer using the method according to the invention. Only a single mold is necessary to equip a plurality of components therein with the corrosion protection layer. Also, completely different shapes of corrosion protection layer are possible.

In a preferred embodiment, the corrosion protection layer is a titanium sheet. A titanium sheet is particularly insensitive to external, corrosive and mechanical influences, but nonetheless may have a very low material thickness for fulfilling the imposed task. The sheet is distinguished by a high strength and is thereby particularly suitable for use on floor carriers or floor rails.

Furthermore, the cover may comprise a film, a film-like structure and/or a track made of a silicone, and a pressure-tight capping. Because of the peripheral capping, the cover may form a sealed connection to the edge of the mold. For this, the capping may extend as a strip along the edge and press the film, film-like structure or silicone track onto the edge, for example with a row of catches which are clamped to the mold. The capping may consequently have a central cutout. The film, film-like structure or silicone track lying between the peripheral edge and the capping may move into the mold because of the evacuation, and there rest practically against arbitrarily shaped components, so that a pressure force can be exerted on the component therein in the direction of the bottom face. The film, film-like structure or silicone track are dimensioned such that at the vacuum to be expected, sufficient stability is guaranteed and multiple use is possible. The component may comprise a profile component with a top side and an underside, wherein the top side is laid on the second surface of the corrosion protection layer. The profile component could be an extruded profile component with constant cross-section, for example a double-T carrier. The component could consist of aluminum alloy or steel alloy. The underside of the component could be shaped like the top side or be different from this.

In an advantageous embodiment, the mold may be trough-like and have an upper opening which can be closed by the cover. The evacuation here takes place by extraction of air from an interior of the mold. The trough-like shape may have a bottom face adapted to the component and widen towards an edge facing away from the bottom face. This simplifies manual insertion of the corrosion protection layer and component, since for handling the component in the mold, space is available towards the sides. The edge could have a flat or slightly convex support face which runs for example parallel to the bottom face. The cover could then be pressed onto the support face in order to create a seal.

Furthermore, providing the corrosion protection layer may comprise cutting it out of a workpiece. The cutting out could be achieved by a laser process or a material removal process.

An advantageous embodiment furthermore comprises applying the hardenable sealing compound to the second surface of the corrosion protection layer and/or the surface to be protected, before laying the surface to be protected onto the second surface. This may take place before introducing the corrosion protection layer and component into the mold. The sealing compound could for example comprise standard polysulfate, or other one- or two-component systems.

The invention furthermore concerns a system for applying a corrosion protection layer to a surface to be protected of a component using the method outlined above, comprising: a mold with a cavity and a bottom face arranged therein, a bend-flexible cover, an air extraction unit, a corrosion protection layer, and a hardenable sealing compound, wherein the corrosion protection layer is configured to be tacked to the component by means of the sealing compound, wherein the mold is configured to receive the component with the corrosion protection layer arranged thereon on the bottom face, wherein the bend-flexible cover is configured to seal the cavity so as to enclose the component concerned, wherein the air extraction unit is configured to evacuate the cavity, and wherein the bend-flexible cover is configured to press on the component when the cavity is evacuated.

In an advantageous embodiment, the mold has an edge which faces away from the bottom face and on which the cover can be laid.

The system may furthermore comprise several fixing means for clamping the cover to the mold. The fixing means may in particular comprise quick-release locks or toggle clamps which can be operated without tools.

As stated above, the cover may comprise a film, a film-like structure and/or a track made of a silicone, and a pressure-tight capping.

Particularly preferably, the capping has a central cutout. The film, film-like structure or silicone track may thereby be given sufficient movability.

In a preferred embodiment, the cover is transparent at least in regions. The method may then be inspected from the outside.

The mold may be formed trough-like and have an upper opening which can be closed by the cover, wherein the mold widens from the bottom face towards the upper opening.

In an advantageous embodiment, the mold may have a removable wall on at least one end face so that several molds can be combined with one another in order to receive longer components. In particular, several trough-like or U-shaped molds could be push-fitted together in order to create longer cavities. The outermost molds are then each closed towards the outside by a wall.

BRIEF DESCRIPTION OF THE DRAWINGS

Further features, advantages and possible applications of the present invention arise from the following description of the exemplary embodiments and the figures. All features described and/or shown in the figures, alone and in arbitrary combination, form the subject of the invention, even independently of their combination in the individual claims or back references. In the figures, the same reference signs designate the same or similar objects.

FIG. 1 shows a sectional view of a system according to the invention.

FIG. 2 shows a top view of a system according to the invention.

DETAILED DESCRIPTION

FIG. 1 shows a schematic sectional illustration of the system 2 for applying a corrosion protection layer 4 to a surface to be protected of a component 6. The system 2 comprises a mold 8 which has a cavity 10 and a bottom face 12 arranged therein. The corrosion protection layer 4 lies on the bottom face 12. Said layer may for example be cut from a titanium sheet.

The component 6 is here for example an extruded aluminum profile with a double-T cross-section and an elongate extent. It has a surface 14 to be protected which, in later installation in a cabin of an aircraft, faces upwards and may be exposed to liquid soiling and condensation. In FIG. 1, the component 6 is oriented in the mold 8 with a top side 7 directed downwards and an underside 9 directed upwards.

The corrosion protection layer 4 has a flat, planar form with a very small material thickness, and is delimited by a first surface 16 lying flush on the bottom surface 12, and a second surface 18 arranged opposite this. The latter is bonded flush to the surface 14 to be protected of the component 6. For this, a hardenable sealing compound 20 is used which for example was applied to the surface 14 to be protected and/or the second surface 18 before insertion of the component 6 and corrosion protection layer 4. Due to an adhesion after application and before hardening of the sealing compound 20, and the joining of the two components 4 and 6, these initially tack together and can thereby be introduced into the mold 8 in the reverse orientation in order to begin a hardening process. After hardening of the sealing compound between the two components 4 and 6, a substance-bonded connection is formed by an adhesion to the boundary surfaces and cohesion of the sealing compound. Due to a cohesion after application of the sealing compound 20, and the joining of the two components 4 and 6, the two components tack together and can accordingly be introduced into the mold 8 in the reverse orientation.

The mold 8 has an edge 22 on which a capping 24 is arranged. This has a cutout 26 so that the entire capping 24 has a strip-like form following the edge 22. Between the capping 24 and the edge 22, a bend-flexible cover 28 is arranged which is situated above the component 6 and lies directly on the underside 9. The bend-flexible cover 28 may be connected to the capping 24 so that the two components form a single part.

By extraction of air from the cavity 10, a vacuum is created there which causes the bend-flexible cover 28 to lie flush against the component 6, and presses this in the direction of the corrosion protection face 4 or the bottom face 12. In order to fix the capping 24 to the mold 8, a row of quick-release clamps 30 is provided which can preferably be actuated manually without tools.

Sealing compound 20 which has been squeezed out of the sides of the component 6 may be used as a transition piece 32. Here it is conceivable that the hardened sealing compound 20 is later ground away.

FIG. 2 shows a top view of the system 2 with component 6 laid therein, and a corrosion protection layer 4 underneath. Here, the exemplary elongate form of the component 6 is visible. If shorter components 6 are introduced into the mold 8, intermediate walls (not shown here) may reduce the effective cavity 12 in order to allow simpler evacuation. End walls 34 could be removable and allow a combination of several molds 8. The mold 8 furthermore has a suction connection 36 at which a vacuum can be applied. An indicated extraction unit 38 is used for this.

In addition, it should be pointed out that the term "comprising" does not exclude other elements or steps, and the term "one" or "a" does not exclude a plurality. It is furthermore pointed out that features which have been described with reference to one of the above exemplary embodiments may also be used in combination with other features of other exemplary embodiments described above. Reference signs in the claims should not be regarded as a restriction.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). This disclosure hereby incorporates by reference the complete disclosure of any patent or application from which it claims benefit or priority.

LIST OF REFERENCE SIGNS

2 System
4 Corrosion protection layer
6 Component
7 Top side
8 Mold
9 Underside
10 Cavity/interior
12 Bottom face
14 Surface to be protected
16 First surface
18 Second surface
20 Sealing compound
22 Edge
24 Capping
26 Cutout
28 Bend-flexible cover
30 Quick-release clamping means/fixing means
32 Transition piece
34 Wall
36 Suction connection
38 Extraction unit

The invention claimed is:

1. A method for applying a corrosion protection layer to a surface to be protected of a component, comprising:
    providing the corrosion protection layer having a first surface and a second surface arranged opposite the first surface;
    laying the first surface of the corrosion protection layer on a bottom face of a mold, wherein the mold is trough-shaped and has sides that extend form the bottom face and widen towards an edge facing away from the bottom face and defining an upper opening;
    laying a top side of the component comprising the surface to be protected on the second surface of the corrosion protection layer to enclose a layer of hardenable sealing compound, wherein the sides of the mold are spaced apart from the component;
    closing the mold by applying a bend-flexible cover across the upper opening above the component on an underside of the component substantially opposing the top side to enclose the corrosion protection layer and the component;
    evacuating the mold by extracting air from an interior of the mold to create a vacuum within the mold so the cover presses the underside of the component in a direction of the corrosion protection layer; and
    removing the vacuum and the cover after hardening of the sealing compound.

2. The method of claim 1, wherein the corrosion protection layer is a titanium sheet.

3. The method of claim 1, wherein the cover comprises: one or more of a film or a track made of a silicone, and a pressure-tight capping.

4. The method of claim 1, wherein providing the corrosion protection layer comprises cutting it out of a workpiece.

5. The method of claim 1, furthermore comprising applying the hardenable sealing compound to the second surface of the corrosion protection layer and/or the surface to be protected, before laying the surface to be protected onto the second surface.

6. The method of claim 1, wherein applying the bend-flexible cover above the component comprises maintaining a separation between the cover and the corrosion protection layer.

* * * * *